(12) United States Patent
Chou et al.

(10) Patent No.: US 9,880,415 B2
(45) Date of Patent: Jan. 30, 2018

(54) LIQUID CRYSTAL DISPLAY MODULE

(71) Applicant: GIANTPLUS TECHNOLOGY CO., LTD., Miao-Li County (TW)

(72) Inventors: Kai-Ju Chou, Maio-Li County (TW); Che-Yao Wu, Miao-Li County (TW); Chun-Jung Lai, Miao-Li County (TW); Ku-Huang Lai, Miao-Li County (TW)

(73) Assignee: Giantplus Technology Co., Ltd., Miao-Li (TW)

( * ) Notice: Subject to any disclaimer, the term of this patent is extended or adjusted under 35 U.S.C. 154(b) by 0 days.

(21) Appl. No.: 14/992,084

(22) Filed: Jan. 11, 2016

(65) Prior Publication Data
US 2017/0199424 A1 Jul. 13, 2017

(51) Int. Cl.
*G02F 1/1335* (2006.01)
(52) U.S. Cl.
CPC .............................. *G02F 1/133553* (2013.01)
(58) Field of Classification Search
CPC .................................................. G02F 1/133553
See application file for complete search history.

(56) References Cited

U.S. PATENT DOCUMENTS

| 8,665,402 | B2* | 3/2014 | Lee | G02F 1/133553 349/113 |
| 2002/0101556 | A1* | 8/2002 | Kikkawa | G02F 1/133345 349/138 |
| 2002/0115297 | A1* | 8/2002 | Lai | G02F 1/133553 438/694 |
| 2002/0140887 | A1* | 10/2002 | Maeda | G02F 1/133553 349/113 |
| 2002/0151178 | A1* | 10/2002 | Lai | G02F 1/133553 438/694 |
| 2003/0142247 | A1* | 7/2003 | Nishiyama | G02B 5/0226 349/67 |
| 2004/0070709 | A1* | 4/2004 | Kanou | G02F 1/133553 349/113 |

* cited by examiner

*Primary Examiner* — Donald Raleigh
(74) *Attorney, Agent, or Firm* — Rosenberg, Klein & Lee

(57) ABSTRACT

The present invention provides a liquid crystal display module, which comprises a bottom substrate, one or more reflective member, an array bump-structure layer, a liquid crystal layer, and a top substrate. The array bump-structure layer comprises one or more first bump region and one or mode second bump region. The second bump region is disposed on the reflective member correspondingly. By using the reflective member, the problem of complicated fabrication of the array bump layer having a plurality of sloping angles according to the prior art can be avoided.

14 Claims, 11 Drawing Sheets

LIQUID CRYSTAL DISPLAY MODULE

FIELD OF THE INVENTION

The present invention relates generally to a liquid crystal display module, and particularly to a liquid crystal display module having a reflective member and an array bump-structure layer.

BACKGROUND OF THE INVENTION

In the display industry, liquid crystal displays (LCDs) defeated traditional market leader, cathode-ray tubes, and plasma displays and have become the current mainstream in the development of flat-panel displays. The displaying principle of LCDs is to make use of dielectric anisotropy of liquid-crystal molecules. By applying an external electric field, the arrangement of liquid-crystal molecules changes, enabling various photoelectric effects in liquid-crystal thin films. As technologies progress, wearable and mobile products have become more popular. This trend also applies to the LCD industry. Presently, the requirements for product specifications in the LCD industry include lightness, thinness, lower radiation, and higher resolution.

Because the liquid crystals in LCDs do not emit light, backlight modules are required for LCDs to display images. Depending on the location of the light source, backlight modules can be further classified into direct and edge lighting types. Nonetheless, no matter what type of backlight module, as the light source, such as LEDs, emits light into the light-guiding plate, light enters the light-guiding plate by refraction, which dissipates photoenergy from the light source. In addition, backlight modules still include light enhancer, reflector, and diffuser stacked on and below the light-guiding plate. The stacked structure further increases the interfacial reflection of light at the air interface. The reflected light will overlap on the display area of a product and result in negative effects including white blooming and reduction in contrast. In order to solve the problem, a reflective LCD has been developed in the LCD industry.

Reflective displays use bump structures having reflective efficacy to reflect ambient light for illuminating the screen. In generally, if the bumps in the bump structure are smooth, the concentrating property of the reflected light is greater, which favors to front viewing. On the contrary, if the bumps of the array bump structure are sloped, wide-angle light can be received and reflected, which favors to wide-angle viewing. Thereby, in addition to saving backlight modules, the power consumption of backlight modules can be saved as well in reflective displays. Besides, the purpose of light and compact design can be achieved accordingly. Some small reflective LCD can be even driven by batteries alone. Hence, reflective displays are quite suitable for portable and mobile products. As the market demands increase, technological development for reflective LCDs is urged.

The current reflective display technology can be further categorized in reflective and transflective types. The reflective type uses external light sources for providing light to displays. Contrarily, the transflective type uses a backlight system to supplement insufficient ambient light. In other words, when the ambient light is sufficient, both the reflective and transflective types need no built-in light source and thus achieving the efficacy of saving power. Nonetheless, reflective displays still have some drawbacks. For example, no matter reflective or transflective type, a layer of bump structure should be fabricated for reflective or reflective/transmissive purposes. Unfortunately, under a single photolithography step, the bump angles of the array bump-structure layer in all pixels of a display panel are identical. It is difficult to cover concentrative and wide-angle properties. If different bump conditions are provided in a single pixel structure, more photolithography steps should be performed to different regions. This would add fabrication steps and thereby substantially increasing process time and costs.

Accordingly, the main purpose of the present invention is to provide an LCD module, which comprises a plurality of array bump-structure layers. In addition, only by a single photolithography step, bumps of the array bump-structure layers having different sloping conditions can be fabricated, which reduces fabrication steps as well as increasing process yield. Moreover, according users' requirements, the present invention can even further reflect merely the light from a specific angle.

SUMMARY

An objective of the present invention is to provide an LCD module, which uses a reflective member formed by an array bump-structure layer having wider reflecting angles.

Another objective of the present invention is to provide an LCD module, which uses the design of a reflective member for adjusting the optimum reflecting angles of the array bump-structure layer according to users' environment.

A further objective of the present invention is to provide an LCD module, which uses the design of a reflective member for providing a plurality of bumps having different sloping angles in the array bump-structure layer.

A still further objective of the present invention is to provide an LCD module, which includes a reflective member formed by an array bump-structure layer with bumps having asymmetric slopes.

In order to achieve the above objectives and efficacies, the present invention provides an LCD module, which comprises a bottom substrate, one or more reflective member, an array bump-structure layer, a liquid crystal layer, and a top substrate. The bottom substrate includes one or more first surface and one or more second surface. The reflective member is disposed on the second surface correspondingly. The array bump-structure layer includes one or more first bump region and one or more second bump region. The sloping angle of a plurality of second bumps in the second bump area is greater than that of a plurality of first bumps. Thereby, the LCD module can control the wide viewing angles to a portion of the regions in the display area according to requirements.

According to an embodiment of the present invention, the second surface is covered by the first surface.

According to an embodiment of the present invention, the shape of the second surface is geometric.

According to an embodiment of the present invention, the first surface divided by the second surface is asymmetric.

According to an embodiment of the present invention, the edges of the second surface are curved.

According to an embodiment of the present invention, the second surface divides the first surface into a plurality if sub-surfaces.

According to an embodiment of the present invention, the second surface further includes one or more sub-surface.

According to an embodiment of the present invention, the second surface is an asymmetric plane.

According to an embodiment of the present invention, the second surface and the first surface are disposed interleavedly on the bottom substrate.

According to an embodiment of the present invention, the shape of the plurality of first bumps are different from the shapes of the plurality of second bumps.

According to an embodiment of the present invention, the vertical angle of the plurality of second bumps is greater than that of the plurality of first bumps.

According to an embodiment of the present invention, the vertical angle between the hypotenuses of the plurality of first bumps and the vertical axis is between 0 and 30 degrees.

According to an embodiment of the present invention, the vertical angle between the hypotenuses of the plurality of second bumps and the vertical axis is between 10 and 40 degrees.

According to an embodiment of the present invention, the nonplanar bumps are disposed on the first surface and the second surface, and each peak of the nonplanar bumps corresponds to the reflective member.

According to an embodiment of the present invention, the width of the plurality of second surfaces is between 2 and 10 micrometers.

According to an embodiment of the present invention, the ratio of the area of the reflective member to the area of the bottom substrate is between 0.1 and 0.9.

DETAILED DESCRIPTION

In order to make the structure and characteristics as well as the effectiveness of the present invention to be further understood and recognized, the detailed description of the present invention is provided as follows along with embodiments and accompanying figures.

According to the prior art, if the array bump layer in a reflective panel is smooth, direct light will be more concentrated. Contrarily, as the array bump layer becomes sloped, wider-angle incident light can be accepted and reflected, which thereby favors wide-angle reflection. In other words, if concentrative direct light is desired, the light at slanted viewing angles will be dark. On the other hand, if the brightness at a slanted viewing angle is desired, the brightness of direct light will be lowered. There are tradeoffs in the design of the array bump layer. Accordingly, the present invention changes the device structure and connection inside the panel to achieve adjustable angles of the array bump layer. By controlling the reflection angle of the array bump layer, the reflection of a reflective panel can be controlled.

Figure 1:
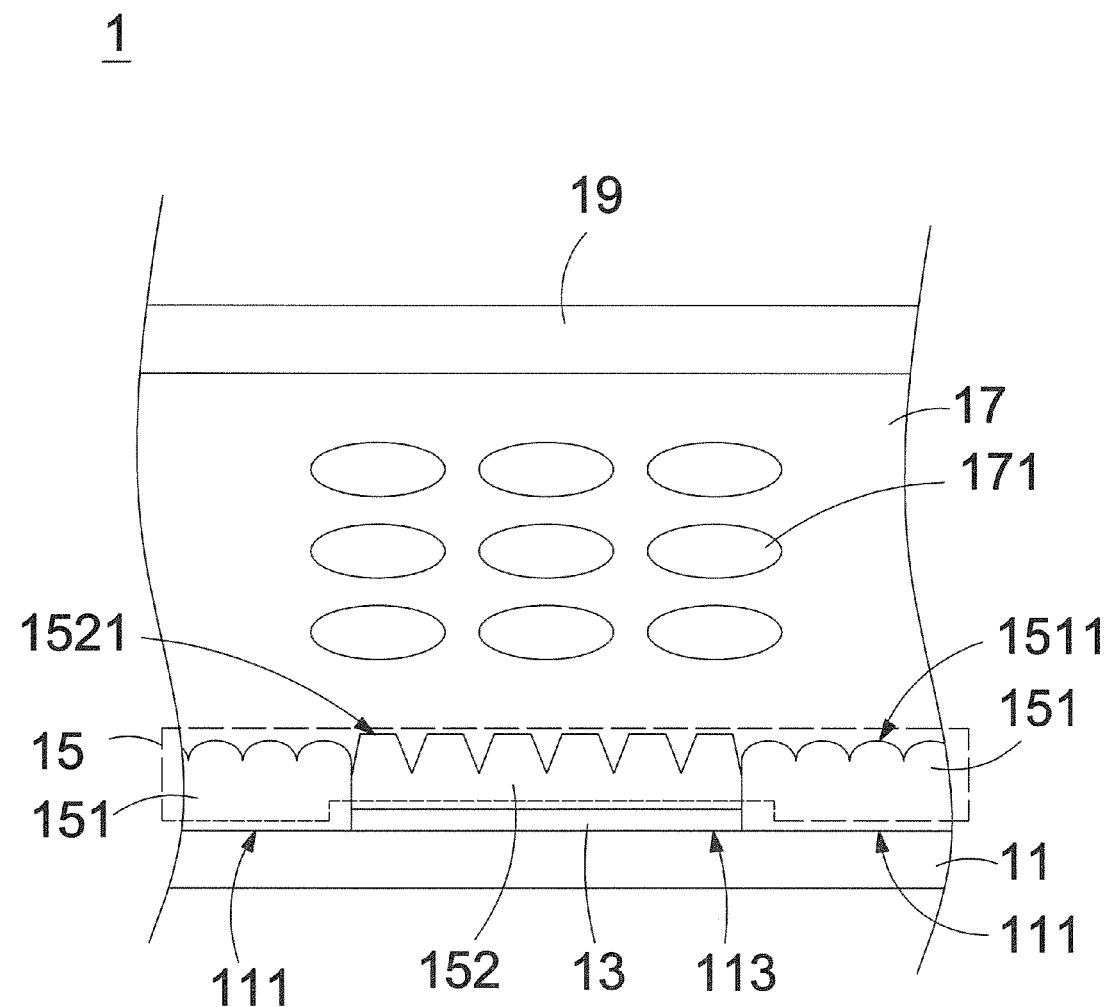
FIG. 1 shows a cross-sectional view of the LCD module according to the first embodiment of the present invention.

Please refer to FIG. 1, which shows a cross-sectional view of the LCD module according to the first embodiment of the present invention. As shown in the figure, the main components in a reflective panel are described. The LCD module 1 according to the present embodiment comprises a bottom substrate 11, one or more reflective member 13, an array bump-structure layer 15, a liquid crystal layer 17, and a top substrate 19. The array bump-structure layer 15 includes one or more first bump region 151 and one or more second bump region 152. The first bump region 151 includes a plurality of first bumps 1511; the second bump region 152 includes a plurality of second bumps 1521.

The bottom substrate 11 includes one or more first surface 111 and one or more second surface 113. The reflective member 13 is disposed on the second surface 113 correspondingly. The first bump region 151 is disposed on the first surface 111 correspondingly. The second bump region 152 is disposed on the reflective member 13 correspondingly. The liquid crystal layer 17 is disposed on the array bump-structure layer 15. Besides, the top substrate 19 is disposed on the liquid crystal layer 17.

Figure 2A:
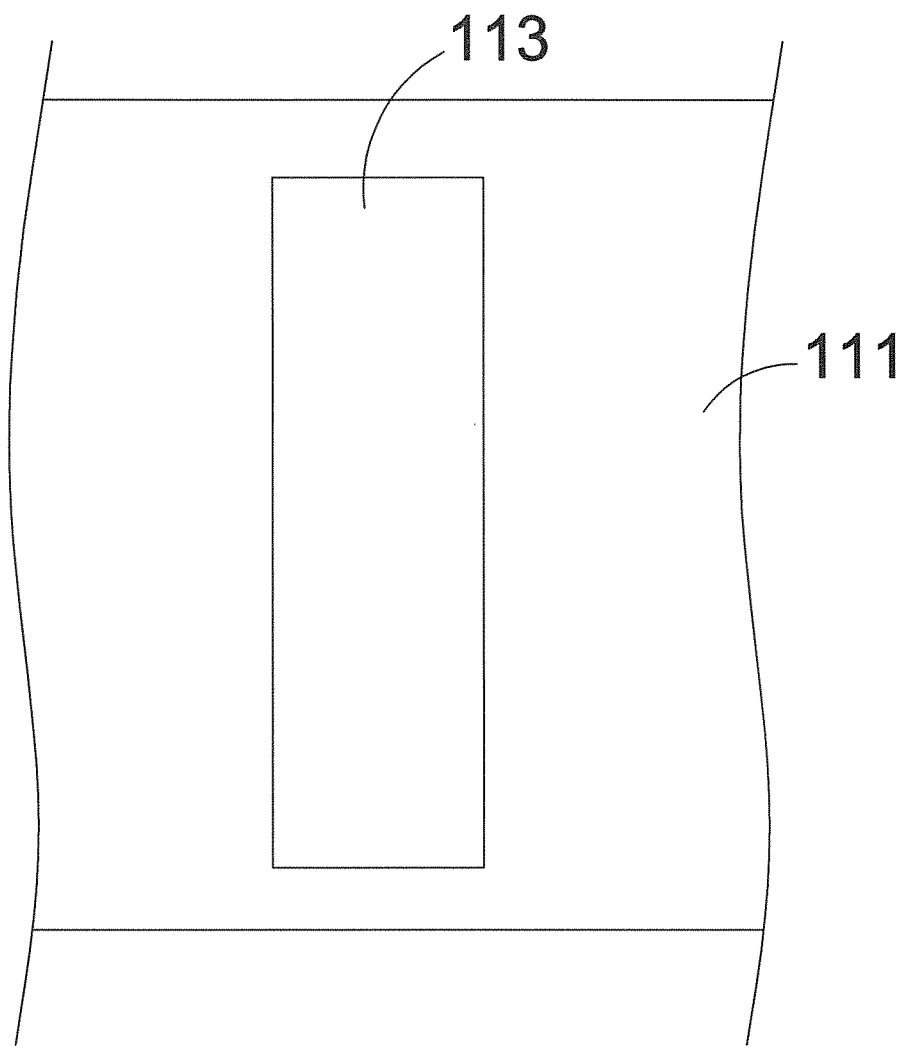
FIGS. 2A to 2E show top views of the reflective member according to the first embodiment of the present invention.
Figure 2B:
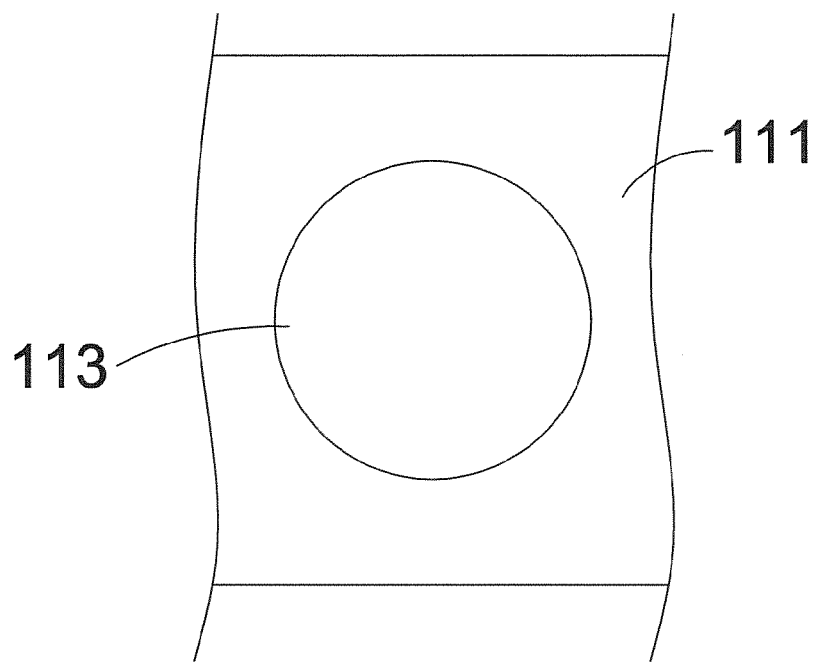
Figure 2C:
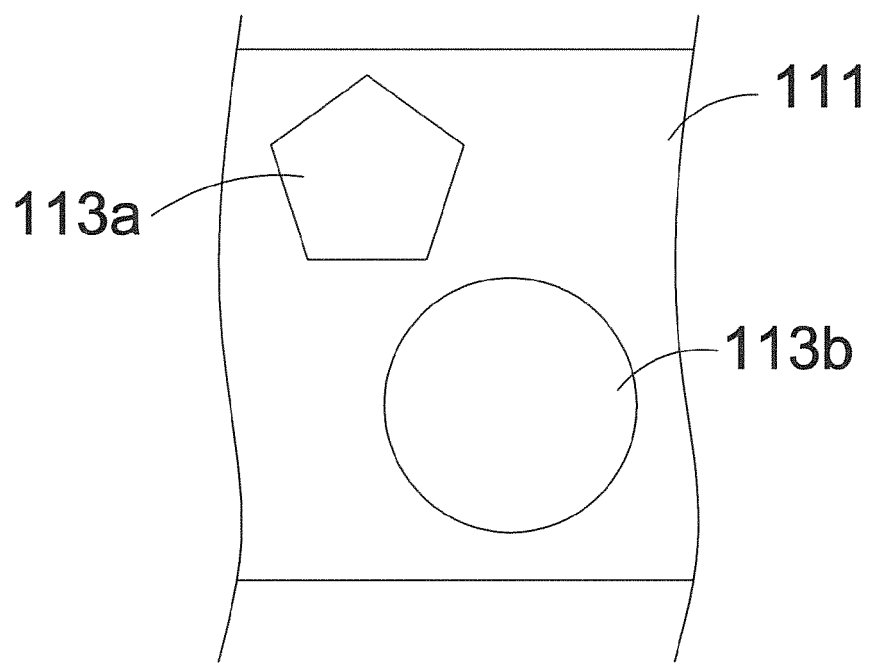

Please refer to FIGS. 2A and 2B, which show top views of the reflective member according to the first embodiment of the present invention. As shown in the figures, the layout of the reflective member 13 is illustrated. A first surface 111 and a second surface 113 are included. The second surface 113 can be an arbitrary geometric shape, including a rectangle, a circle, an arbitrary polygon, an irregular shape. In addition, the first surface 111 can be surrounded by the second surface 113 and forming a closed region. Please refer to FIG. 2C, which shows the layout of another reflective member 13. The plurality of second surfaces 113 are geometrically shaped.

Figure 2D:
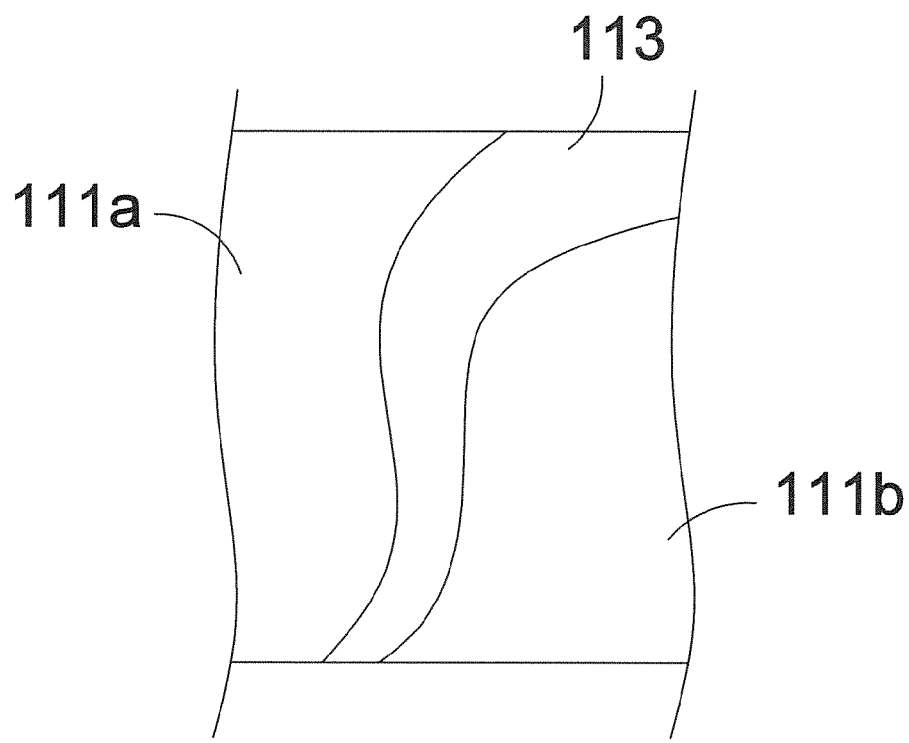
Figure 2E:
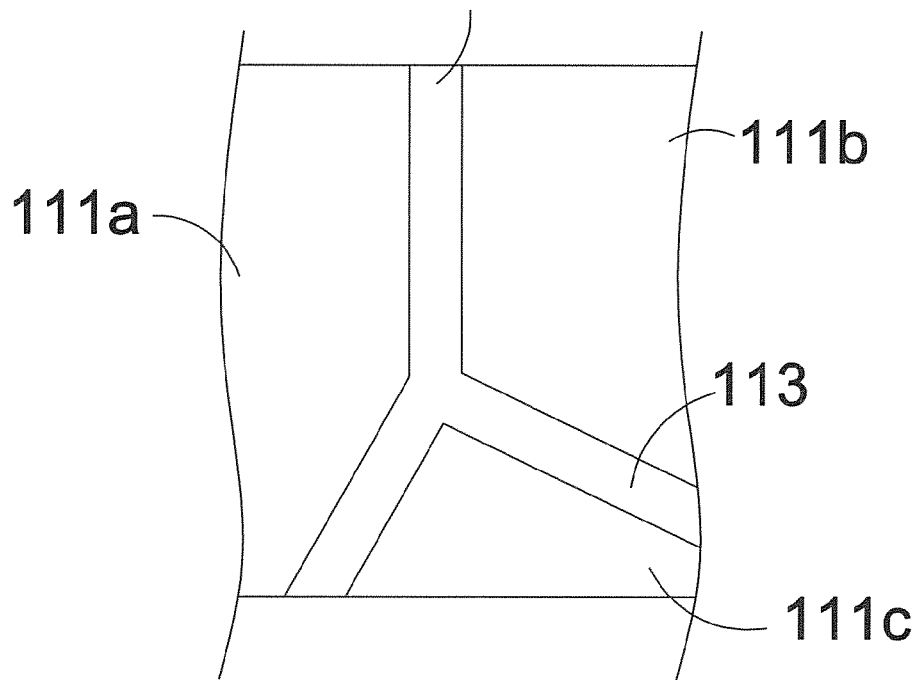

Next, please refer to FIGS. 2D and 2E, which show the layouts of another reflective member 13. A plurality of first surfaces 111 and one or more second surface 113 are included. The plurality of first surfaces 111 can be arbitrary geometric shapes. Alternative, the shape of the second surface 113 can be used to dividing the plurality of first surfaces 111 into multiple pieces.

According to the first embodiment, the reflective member 13 is disposed on the second surface 113 of the bottom substrate 11. In the lithography process step of fabricating the array bump-structure layer 15, when the light illuminates the surface of the reflective member 13, it will be reflected to the corresponding region on the array bump-structure layer 15 for secondary exposure, which makes the sloping angle of the plurality of first bumps 1511 of the array bump-structure layer 15 different from that of the plurality of second bumps 1521 of the array bump-structure layer 15. Furthermore, because two exposures are performed on the reflective member 13, vertical angle of the sloping angle of the plurality of second bumps 1521 of the array bump-structure layer 15 will be greater than that of the plurality of first bump 1511. Besides, because the reflective member 13 is formed prior to the array bump-structure layer 15, the reflective member 13 facilitates the effective angle of light reflection and hence achieving wide viewing angles. Moreover, the location of the reflective member 13 can be designed freely to control the reflection angle of an arbitrary region on the LCD module 1.

Figure 3:
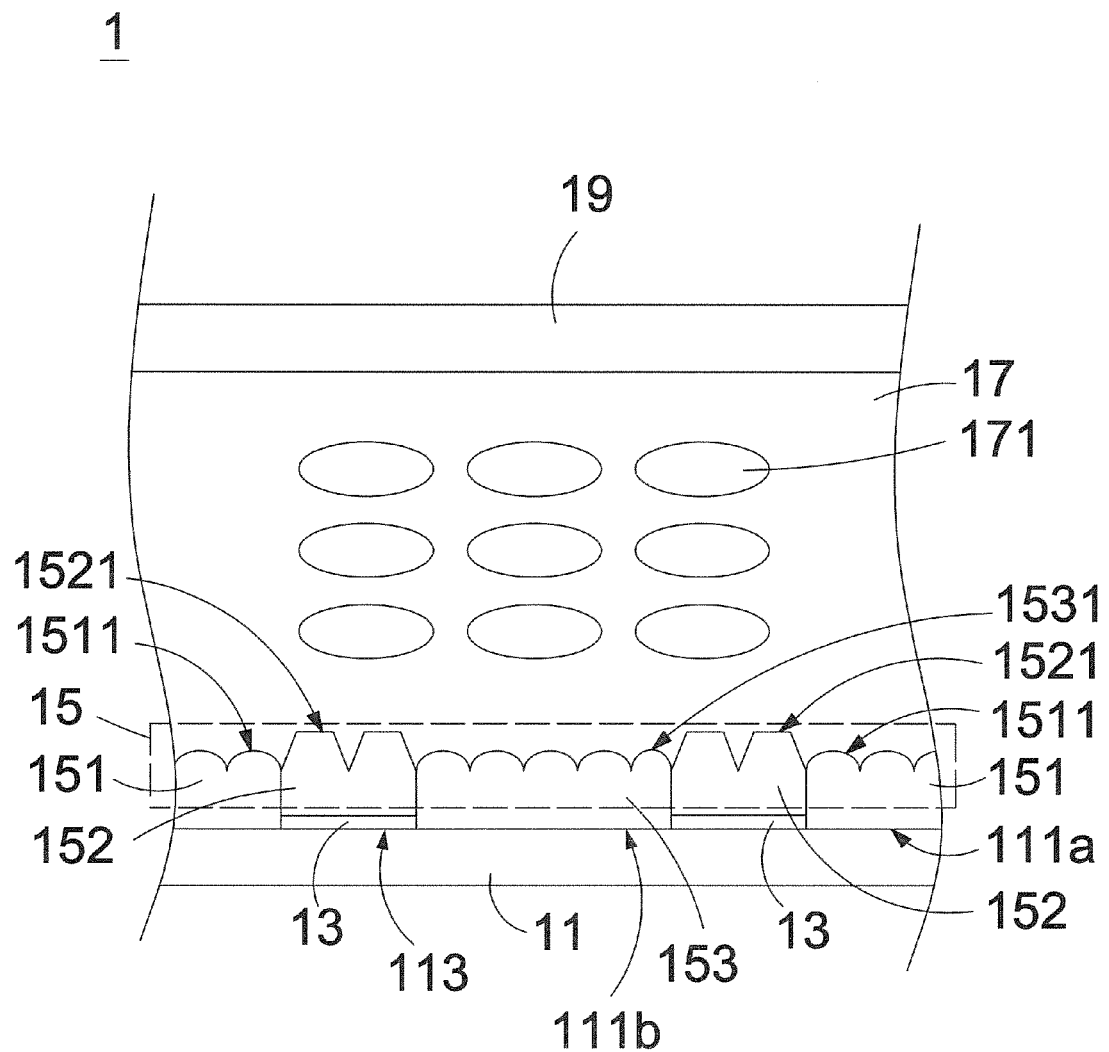
FIG. 3 shows a cross-sectional view of the LCD module according to the second embodiment of the present invention.

Please refer to FIG. 3, which shows a cross-sectional view of the LCD module according to the second embodiment of the present invention. As shown in the figure, the main components of the LCD module according to the present embodiment are illustrated. The LCD module 1 according to the present embodiment comprises a bottom substrate 11, one or more reflective member 13, an array bump-structure layer 15, a liquid crystal layer 17, and a top substrate 19. The array bump-structure layer 15 includes one or more first bump region 151 and one or more second bump region 152. The first bump region 151 includes a plurality of first bumps 1511; the second bump region 152 includes a plurality of second bumps 1521.

Figure 4A:
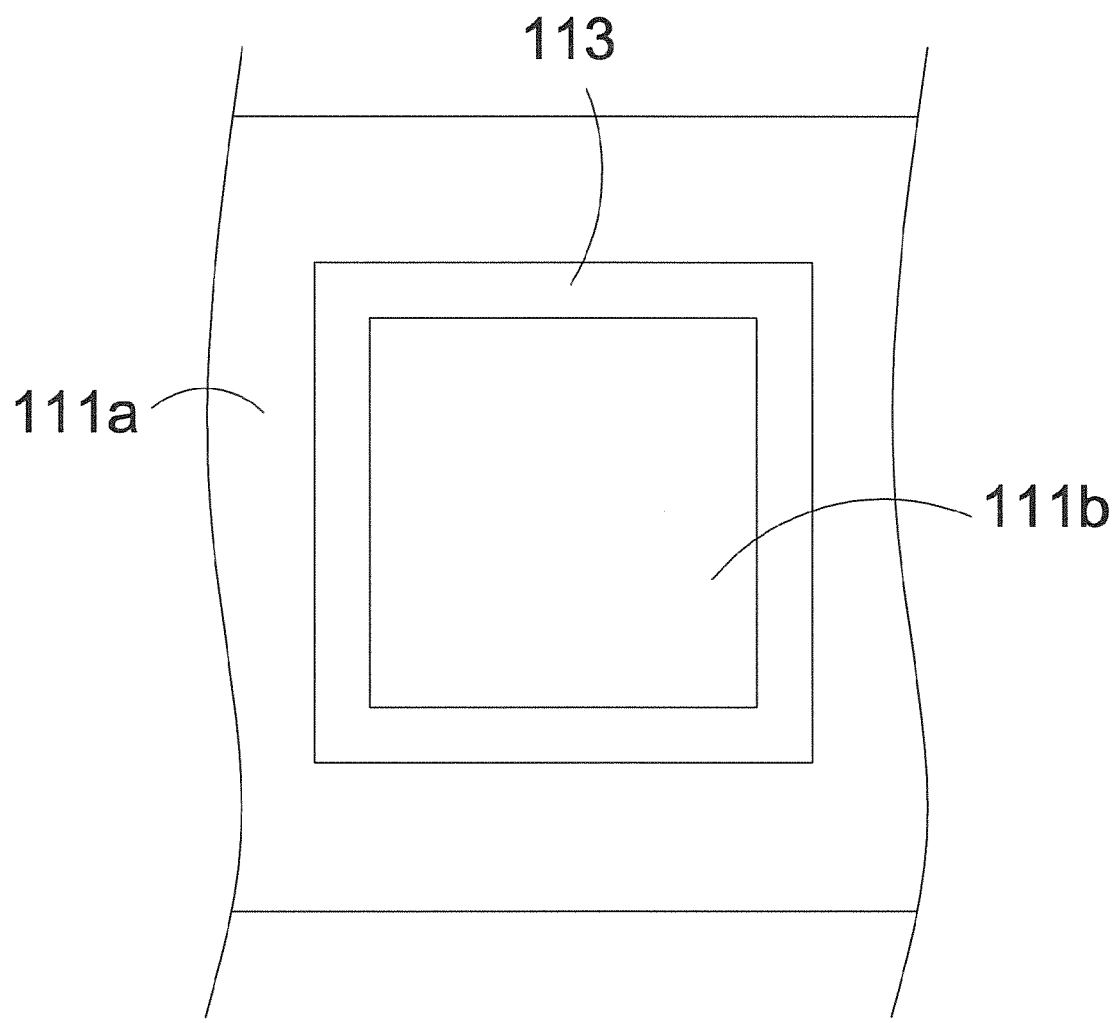
FIGS. 4A to 4C show schematic diagrams of the reflective member according to the second embodiment of the present invention.
Figure 4B:
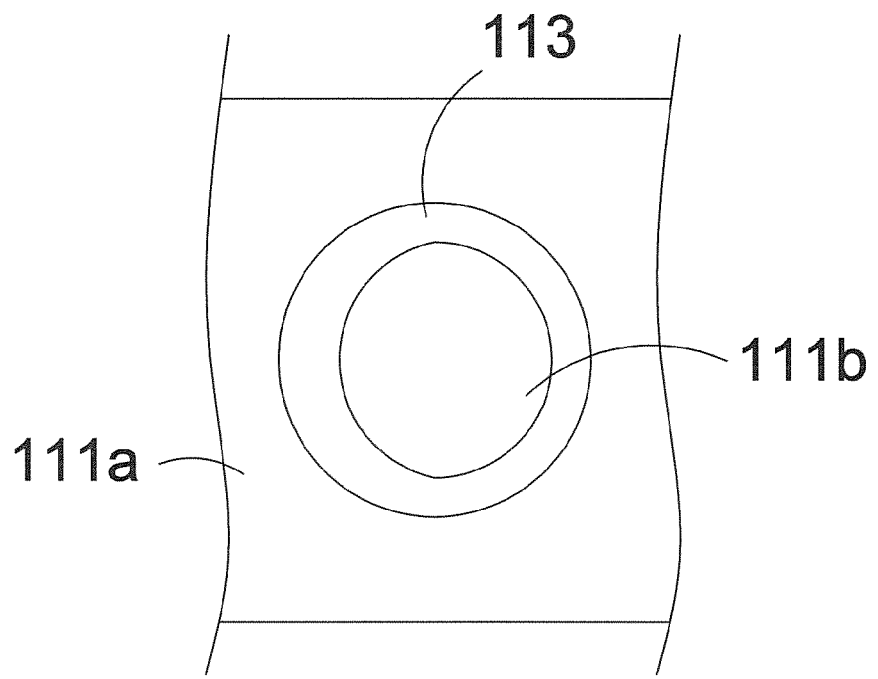
Figure 4C:
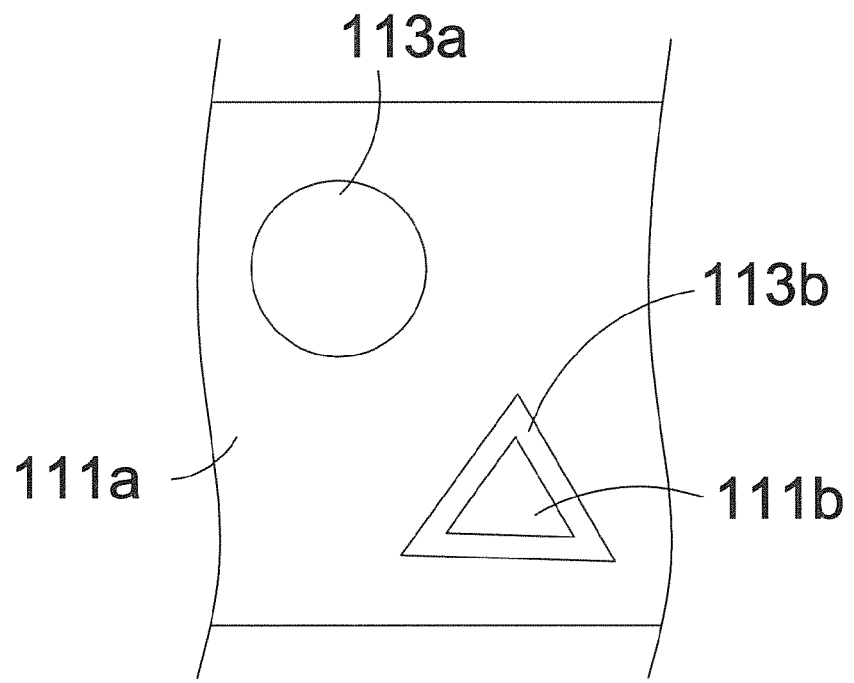

Please refer to FIGS. 4A to 4C, which show schematic diagrams of the reflective member according to the second embodiment of the present invention for illustrating the layouts of the reflective member 13. As shown in the figures, the difference between the present embodiment from the previous one is that a first surface 111 of the bottom substrate 11 according to the present embodiment further includes a sub-surface 111a and another sub-surface 111b. The sub-surface 111b is a closed region surrounded by the second surface 113. In other words, the second surface 113 can be designed in a hollow shape such as an annular or a frame shape. The hollowed portion is the sub-surface 111b. In addition, the shape of the second surface 113 can be an asymmetric planar shape.

By disposing the hollow sub-surface 111b, the shape of the reflective member 13 can be arbitrary. Namely, if the display is used when the external light source is uneven, the reflective member 13 can be disposed on partial regions for forming bumps with steeper angles and giving greater reflection angles.

Figure 5:
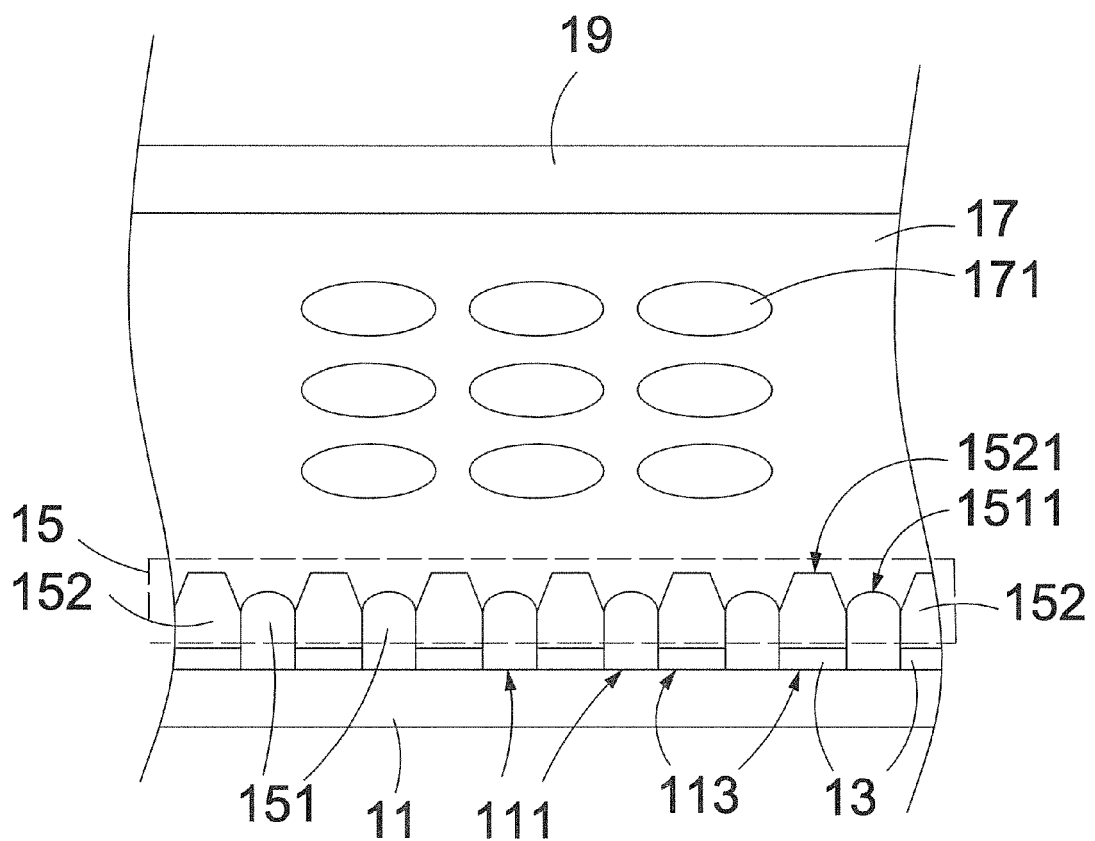
FIG. 5 shows a cross-sectional view of the LCD module according to the third embodiment of the present invention.
Figure 6:
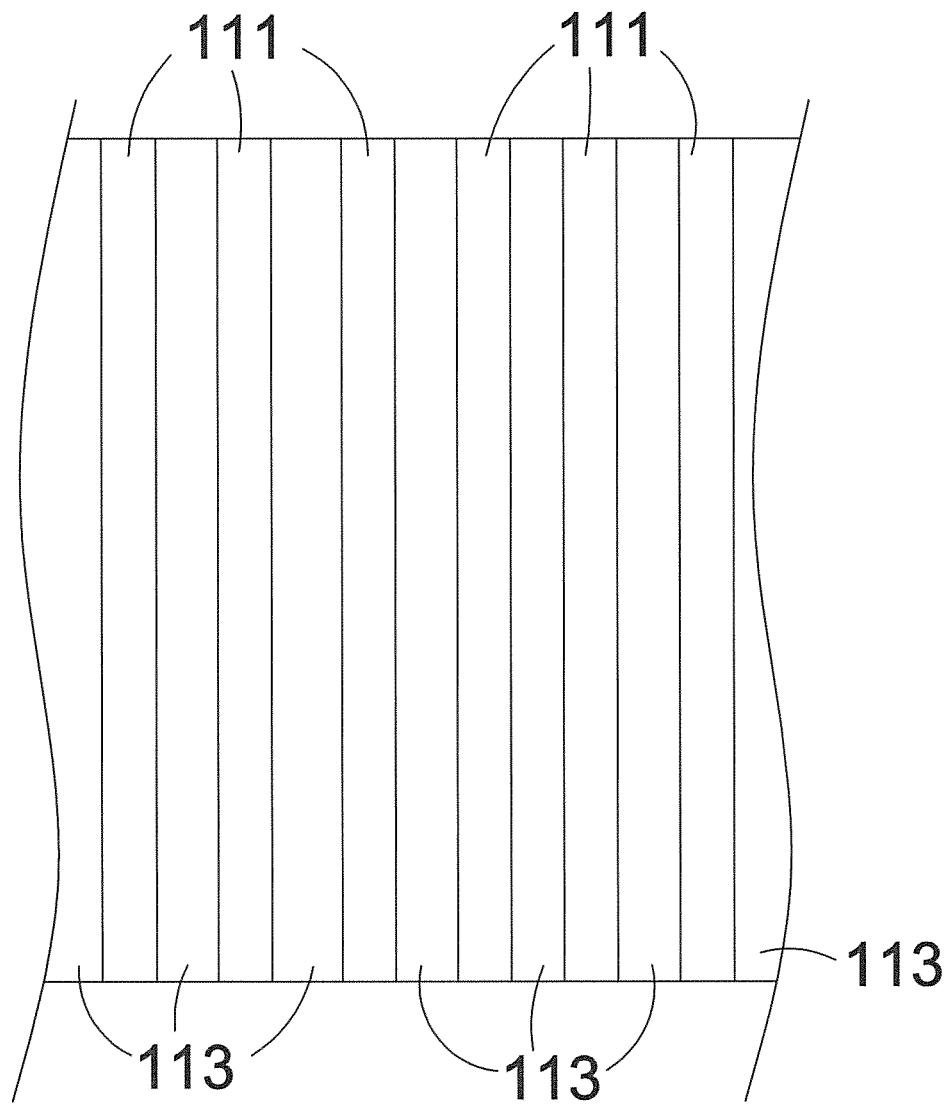
FIG. 6 shows a schematic diagram of the reflective member according to the third embodiment of the present invention.

Please refer FIG. 5 and FIG. 6, which show a cross-sectional view of the LCD module and a schematic diagram of the reflective member according to the third embodiment of the present invention. First, as shown in FIG. 5, the main components of the LCD module according to the present embodiment are illustrated. The LCD module 1 according to the present embodiment comprises a bottom substrate 11, one or more reflective member 13, an array bump-structure layer 15, a liquid crystal layer 17, and a top substrate 19. The array bump-structure layer 15 includes one or more first bump region 151 and one or more second bump region 152. The first bump region 151 includes a plurality of first bumps 1511; the second bump region 152 includes a plurality of second bumps 1521. Next, please refer to FIG. 6. The difference between the present embodiment from the previous ones is that the first surface 111 and the second surface 113 according to the present embodiment disposed interleavedly in repeated stripes.

Because the reflective member 13 is disposed interleavedly, when the external light source illuminates the panel uniformly, the average reflection angle of the whole panel is broadened without sacrificing the comfort of a viewer caused by uneven brightness over the panel.

Figure 7:
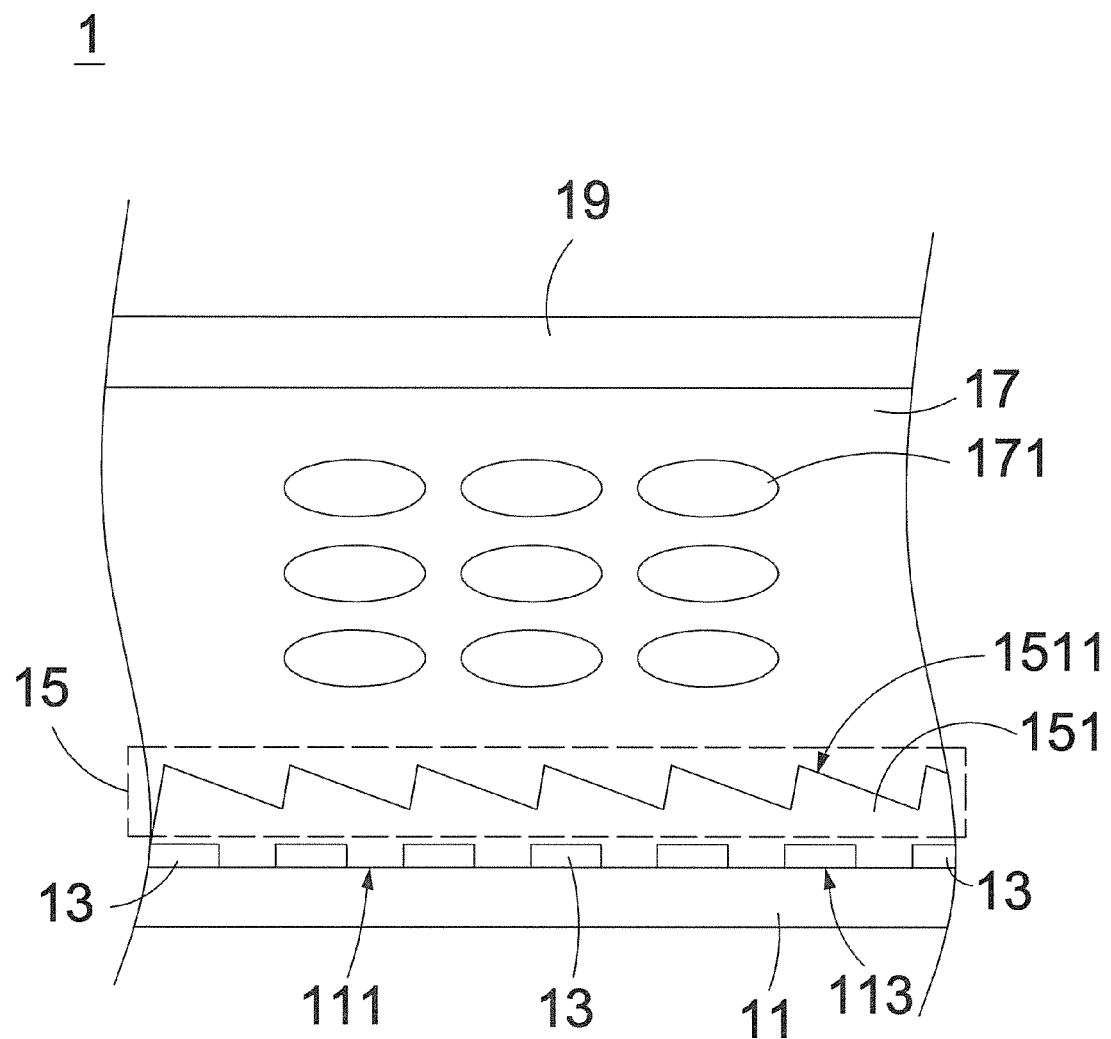
FIG. 7 shows a cross-sectional view of the LCD module according to the fourth embodiment of the present invention.
Figure 8:
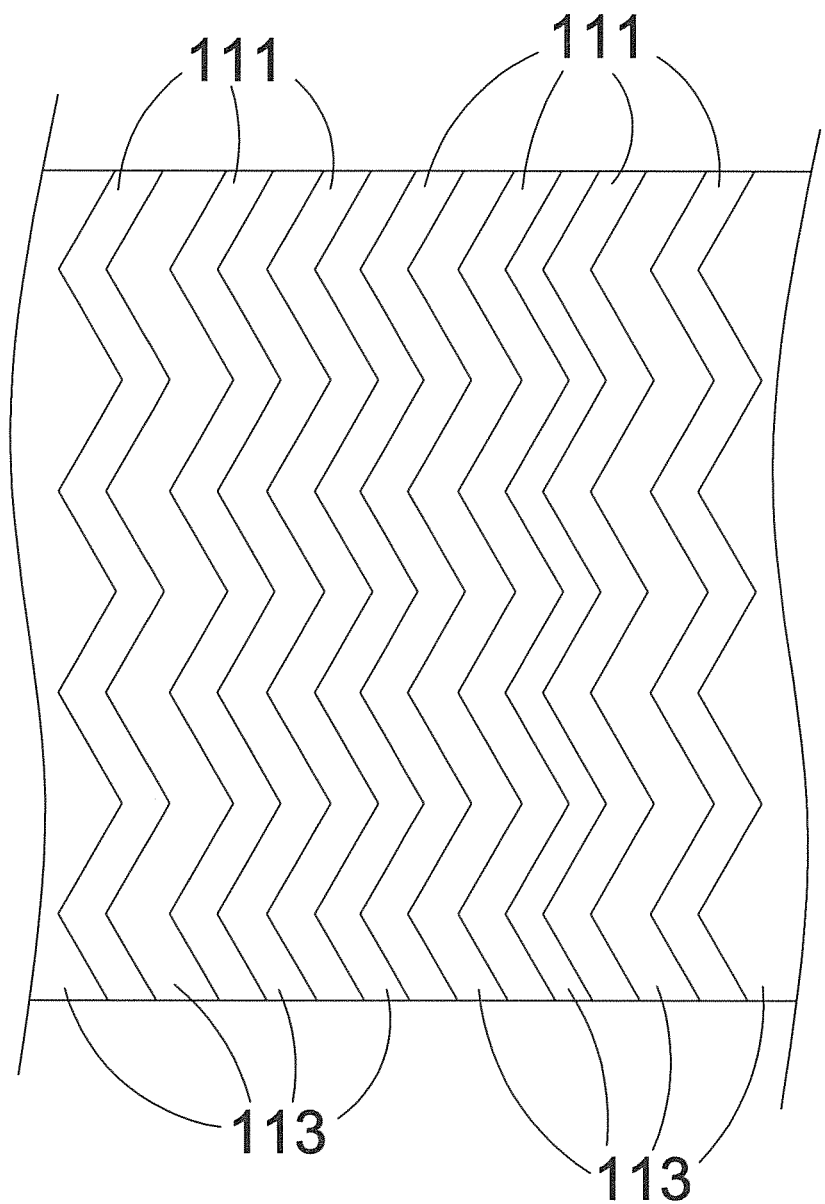
FIG. 8 shows a schematic diagram of the reflective member according to the fourth embodiment of the present invention.

Please refer to FIG. 7 and FIG. 8, which show a cross-sectional view of the LCD module and a schematic diagram of the reflective member according to the fourth embodiment of the present invention. As shown in the figures, the main components of the LCD module according to the fourth embodiment are illustrated. The LCD module 1 according to the present embodiment comprises a bottom substrate 11, one or more reflective member 13, an array bump-structure layer 15, a liquid crystal layer 17, and a top substrate 19. The array bump-structure layer 15 includes one or more first bump region 151 and one or more second bump region 152. The first bump region 151 includes a plurality of first bumps 1511; the second bump region 152 includes a plurality of second bumps 1521. The difference between the present embodiment from the previous ones is that the array bump-structure layer 15 includes a nonplanar bump 1511 disposed on the first surface 111 and the second surface 113. In addition, each peak of the nonplanar bump 1511 corresponds to the reflection member 13. Furthermore, the width of the plurality of second surfaces is between 2 and 10 micrometers.

Because the array bump-structure layer 15 includes a nonplanar bump 1511, the nonplanar bump 1511 is disposed on the first and second surfaces 111, 113, and each peak of the nonplanar bump 1511 corresponds to the reflection member 13, the two sides of adjacent peaks for the nonplanar bump 1511 are asymmetric, making the reflection angle of the panel shifted towards a specific side. In other words, when the display is disposed at a corner, because there is no much light from the wall side, the reflection angle are designed towards the non-wall-side. Thereby, the problem of low light reflection from the corner can be solved.

To sum up, the present invention provides an LCD module, which comprises a bottom substrate, one or more reflective member, an array bump-structure layer, a liquid crystal layer, and a top substrate. The bottom substrate includes one or more first surface and one or more second surface. The reflective member is disposed on the second surface correspondingly. The array bump-structure layer includes one or more first bump region and one or more second bump region. The first bump region is disposed on the first surface correspondingly and includes a plurality of first bumps; the second bump region is disposed on the reflective member correspondingly and includes a plurality of second bumps. The liquid crystal layer is disposed on the array bump-structure layer. Besides, the top substrate is disposed on the liquid crystal layer. Furthermore, the present invention provides another array bump-structure layer including a nonplanar bump. The nonplanar bump is disposed on a first surface and a second surface of a top substrate. In addition, each peak of the nonplanar bump corresponds to the reflection member.

Accordingly, the present invention conforms to the legal requirements owing to its novelty, nonobviousness, and utility. However, the foregoing description is only embodiments of the present invention, not used to limit the scope and range of the present invention. Those equivalent changes or modifications made according to the shape, structure, feature, or spirit described in the claims of the present invention are included in the appended claims of the present invention.

The invention claimed is:

1. A liquid crystal display module, comprising:
a bottom substrate, having one or more first surface and one or more second surface on the same side;
one or more reflective member disposed on said second surface correspondingly;
an array bump-structure layer, including one or more first bump region and one or more second bump region, said first bump region disposed on said first surface correspondingly and having a plurality of first bumps, and said second bump region disposed on said reflective member correspondingly and having a plurality of second bumps, wherein a shapes of said first bump and said second bump are different and the vertical angles of said plurality of second bumps are greater than the vertical angles of said plurality of first bumps;
a liquid crystal layer, disposed on said array bump-structure layer; and
a top substrate, disposed on said liquid crystal layer;
wherein said second surface is surrounded by said first surface.

2. The liquid crystal module of claim 1, wherein said second surface has a geometric shape.

3. The liquid crystal module of claim 1, wherein said first surface divided by said second surface is asymmetric.

4. The liquid crystal module of claim 3, wherein the edges of said second surface are curved.

5. The liquid crystal module of claim 1, wherein said second surface divides said first surface into a plurality of sub-surfaces.

6. The liquid crystal module of claim 1, wherein said second surface further includes one or more sub-surface surrounded by said second surface.

7. The liquid crystal module of claim 6, wherein said second surface has an asymmetric planar shape.

8. The liquid crystal module of claim 1, wherein said second surface and said first surface are disposed on said bottom substrate in alternating order.

9. The liquid crystal module of claim 1, wherein the vertical angle between the hypotenuses of said plurality of first bumps and the vertical axis is between 0 and 30 degrees.

10. The liquid crystal module of claim 1, wherein the vertical angle between the hypotenuses of said plurality of second bumps and the vertical axis is between 10 and 40 degrees.

11. The liquid crystal display module of claim 1, wherein the ratio of the area of said reflective member to the area of said bottom substrate is between 0.1 and 0.9.

12. A liquid crystal module, comprising:
a bottom substrate, having one or more first surface and one or more second surface on the same side;
one or more reflective member disposed on said second surface;
an array bump-structure layer, including one or more first bump region and one or more second bump region, said first bump region disposed on said first surface correspondingly and having a plurality of first bumps, and said second bump region disposed on said reflective member correspondingly and having a plurality of second bumps, wherein a shapes of said first bump and said second bump are different and the vertical angles of said plurality of second bumps are greater than the vertical angles of said plurality of first bumps;
wherein said array bump-structure layer, having a non-planar bump disposed on said first surface and said second surface, and each peak of said nonplanar bump corresponding to said reflective member;
a liquid crystal layer, disposed on said array bump-structure layer; and
a top substrate, disposed on said liquid crystal layer;
wherein said second surface is surrounded by said first surface.

13. The liquid crystal display module of claim 12, wherein the width of said plurality of second surfaces is between 2 and 10 micrometers.

14. The liquid crystal display module of claim 12, wherein the ratio of the area of said reflective member to the area of said bottom substrate is between 0.1 and 0.9.

* * * * *